United States Patent [19]
Ishihara et al.

[11] Patent Number: 5,527,229
[45] Date of Patent: Jun. 18, 1996

[54] PLANETARY DIFFERENTIAL GEAR SYSTEM PROVIDED WITH A DIFFERENTIAL ACTION LIMITING MECHANISM

[75] Inventors: Sunao Ishihara; Keiji Nemoto; Takahito Takekawa; Hiroshi Wakui, all of Saitama-ken, Japan

[73] Assignee: Honda Giken Kogyo Kabushiki Kaisha, Tokyo, Japan

[21] Appl. No.: 408,012

[22] Filed: Mar. 21, 1995

[30] Foreign Application Priority Data

Mar. 22, 1994 [JP] Japan .................................. 6-076442
Mar. 22, 1994 [JP] Japan .................................. 6-076443

[51] Int. Cl.⁶ .................................................. F16H 48/06
[52] U.S. Cl. ........................ 475/249; 475/248; 475/252
[58] Field of Search ............................ 475/248, 249, 475/252

[56] References Cited

U.S. PATENT DOCUMENTS

| | | | |
|---|---|---|---|
| 5,156,578 | 10/1992 | Hirota | 475/249 X |
| 5,194,054 | 3/1993 | Amborn et al. | 475/249 |
| 5,217,416 | 6/1993 | Dick | 475/249 X |
| 5,269,730 | 12/1993 | Hirota | 475/249 X |
| 5,322,484 | 6/1994 | Reuter | 475/249 X |
| 5,326,333 | 7/1994 | Niizawa et al. | 475/249 |
| 5,458,546 | 10/1995 | Teraoka | 475/252 X |
| 5,484,348 | 1/1996 | Brown et al. | 475/248 |

FOREIGN PATENT DOCUMENTS 1-166158 11/1989 Japan .
4-95641 3/1992 Japan .
4-231761 8/1992 Japan .

*Primary Examiner*—Charles A. Marmor
*Assistant Examiner*—Peter Kwon
*Attorney, Agent, or Firm*—Nikaido, Marmelstein, Murray & Oram

[57] ABSTRACT

In a planetary differential gear system using helical gears, a clutch is interposed between a carrier for planetary gears and a differential casing, and adapted to be engaged by an axial thrust force produced by a sun gear. First and second axle shafts are provided with splined internal ends which are received in complementary bores of the sun gear and the carrier, respectively. The first axle shaft is received in a bore of the differential casing so as to be freely slidable and rotatable jointly with the sun gear. Therefore, the thrust force produced by the sun gear when a drive input is applied to the differential system can be transmitted to the friction clutch without being obstructed by the friction produced by the splined coupling between the first axle shaft and the sun gear, or disturbed by any unpredictable force of engagement between the first axle shaft and the sun gear. In this case, by providing a suitable arrangement for limiting a movement of the carrier in a direction to engage the clutch within a first prescribed range, it is possible to prevent any metallic contacts in the friction plates of the clutch even when the friction plates are substantially worn out.

8 Claims, 2 Drawing Sheets

PLANETARY DIFFERENTIAL GEAR SYSTEM PROVIDED WITH A DIFFERENTIAL ACTION LIMITING MECHANISM

TECHNICAL FIELD

The present invention relates to a differential gear system, and in particular to a differential gear system comprising a planetary gear mechanism using helical gears, and a differential action limiting mechanism consisting of a frictional clutch actuated by a thrust produced by the helical gears of the planetary gear system.

BACKGROUND OF THE INVENTION

Japanese utility model publication (kokai) No. 1-166158 discloses a planetary differential gear system which comprises a differential casing provided with an external ring gear for receiving a drive input, and an internal ring gear disposed coaxially with the external gear, and rotatably supported by a fixed housing in a coaxial relationship, a sun gear rotatably supported inside the differential casing by the differential casing, and disposed coaxially with the internal gear, the sun gear being provided with a first splined bore coaxial with the sun gear for receiving a first axle shaft, engagement means for restricting a relative axial displacement between the first axle shaft and the sun gear, a carrier rotatably supported by the differential casing, carrying first planetary gears and second planetary gears both in a freely rotatable manner, the first planetary gears meshing with the internal gear, the second planetary gears meshing with the first planetary gears and the sun gear, the carrier being provided with a second splined bore coaxial with the sun gear for receiving a second axle shaft, and a clutch interposed between the carrier and the differential casing, and adapted to be engaged by a spring force of a dish spring which constantly applies an axial force to the clutch. Thus, the various gears provide a well known differential action, and the clutch constantly produces a force limiting the differential action. In other words, the differential action is limited by a constant degree at all times.

Japanese patent laid open publication (kokai) No. 4-95641 discloses a planetary center differential gear system for dividing a drive torque from an engine to front wheels and rear wheels. In this differential system, a pair of clutches are interposed on either axial end of each of the first planetary gears which are rotatably supported by the carrier. These clutches are interposed between the first planetary gears and the carrier. The gears consist of helical gears, and an axial reaction force is produced between each meshing pair of the helical gears. Therefore, when a torque is transmitted between the internal gear and the first planetary gears, the first planetary gears are forced in either axial direction depending on the direction of torque transmission. Thus, the differential action is limited whenever a drive torque or a braking torque is applied to the differential system. By appropriately determining the engagement forces of the two clutches on each first planetary gear, it is possible to produce two different properties of limiting the differential action depending on whether the engine is driving the wheels or the wheels are driving the engine (engine brake).

Japanese patent laid open publications (kokai) No. 4-231761 discloses a planetary differential gear system which is used to distribute power between right and left wheels. This planetary differential gear system is similar to the one disclosed in Japanese patent laid open publication (kokai) No. 4-95641 in that helical gears are used for producing reaction forces for actuating clutches adapted to limit the differential action, and two different properties of limiting the differential action can be produced depending on whether the engine is driving the wheels or the wheels are driving the engine. In this case, the two clutches are provided between the carrier and the differential casing, and between the sun gear and the differential casing, respectively. Also, because two sets of planetary gears are provided on the carrier, the axial reaction forces acting on them cancel out, and the reaction force is produced only in the sun gear. Thus, depending on the direction of torque transmission, either the carrier is urged in the direction to engage one of the clutches by the sun gear or the sun gear directly actuates the other clutch.

This planetary differential gear system allows the differential action to be limited depending on whether the engine is driving the wheels or the wheels are driving the engine. However, in reality, the spline coupling between the axle shaft and the splined bore of the sun gear does not allow free axial sliding movement between them particularly when a torque is being transmitted between them. In this differential gear system, it is essential that the helical gears, in particular the sun gear, can freely move in the axial direction for the frictional clutch to be able to limit the differential action of the differential gear system in a reliable fashion. Thus, if the axial movement of the helical gears is not effected in a smooth manner, the thrust acting on the frictional clutch may become unstable, and the differential action cannot be limited in a stable manner in particular in terms of a transient response.

Also, as the clutch facing wears out, the stroke of the sun gear necessary to engage the frictional clutch progressively increases. When the wear of the friction plates is excessive, metallic contacts may occur, and seizure of the mutually sliding members may even occur. In particular, the metallic contacts would produce highly undesirable noises which should be avoided. According to the invention disclosed in Japanese utility model publication (kokai) No. 1-166158), a limit is imposed on the axial movement of a pressure member in the direction to engage the clutch so as to avoid such metallic contacts.

In any case, it is necessary to provide means for controlling the possible range of movement of the sun gear to prevent any undesirable consequences from developing when the friction plates of the clutch have worn out.

BRIEF SUMMARY OF THE INVENTION

In view of such problems of the prior art, a primary object of the present invention is to provide a planetary differential gear system provided with means for restricting the differential action of the system which can operate in a reliable fashion when required.

A second object of the present invention is to provide such a differential gear system which can prevent any undesirable consequences such as excessive wear and noises from developing even when the clutch has significantly worn out.

A third object of the present invention is to provide such a different gear system which is made reliable without requiring any complicated structure.

These and other objects of the present invention can be accomplished by providing a differential gear system, comprising: a differential casing provided with an external gear for receiving a drive input, and an internal helical gear disposed coaxially with the external gear, and rotatably supported by a fixed housing in a coaxial relationship; a helical sun gear rotatably supported inside the differential casing by the differential casing, and disposed coaxially with the internal helical gear, the sun gear being provided with a first splined bore coaxial with the sun gear for receiving a first axle shaft; engagement means for restricting a relative axial displacement between the first axle shaft and the sun gear; a carrier rotatably supported by the differential casing, carrying a first helical planetary gear and a second helical planetary gear both in a freely rotatable manner, the first planetary gear meshing with the helical internal gear, the second helical planetary gear meshing with the first helical planetary gear and the sun gear, the carrier being provided with a second splined bore coaxial with the sun gear for receiving a second axle shaft; and a clutch interposed between the carrier and the differential casing, and adapted to be engaged by an axial thrust force produced by the sun gear and applied to the carrier by the sun gear; the first axle shaft being received in a bore of the differential casing so as to be freely slidable and rotatable jointly with the sun gear.

Thus, the thrust force produced by the sun gear when a drive input is applied to the differential system can be transmitted to the frictional clutch without being obstructed by the friction produced by the splined coupling between the first axle shaft and the sun gear, or disturbed by any unpredictable force of engagement between the first axle shaft and the sun gear. In this case, by providing suitable means for limiting a movement of the carrier in a direction to engage the clutch within a first prescribed range, it is possible to prevent any metallic contacts in the friction plates of the clutch even when the friction plates are substantially worn out.

Since the first axle shaft is allowed to move axially along with the sun gear, it is preferable to provided second stopper means for limiting an inward movement of the first axle shaft within a second prescribed range which, however, is greater than the first prescribed range so that the frictional clutch may be allowed to operate until the wear of the friction plates reaches a limit defined by the carrier abutting the first stopper means. For instance, the second stopper means may comprise an annular shoulder surface defined in the first axle shaft and adapted to be engaged by an opposing end surface of the differential casing.

The engagement means ensures the first axle shaft to move jointly with the sun gear, and may comprise a set ring fitted in annular grooves provided in mutually aligned positions of the splined bore of the sun gear and the first axle shaft received in the splined bore. Since the splined shaft is axially moveable jointly with the sun gear, it is preferable to provide means for determining the axial position of the first axle shaft in a reliable manner. To this end, the engagement means may further comprise an internal radial flange provided in the sun gear so as to engage an inner axial end of the first axle shaft. Alternatively, the engagement means may further comprise a member provided on the carrier so as to engage an inner axial end of the first axle shaft, or an annular shoulder surface provided on the first axle shaft, and an end surface of the sun gear adapted to engage the annular shoulder surface of the first axle shaft.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
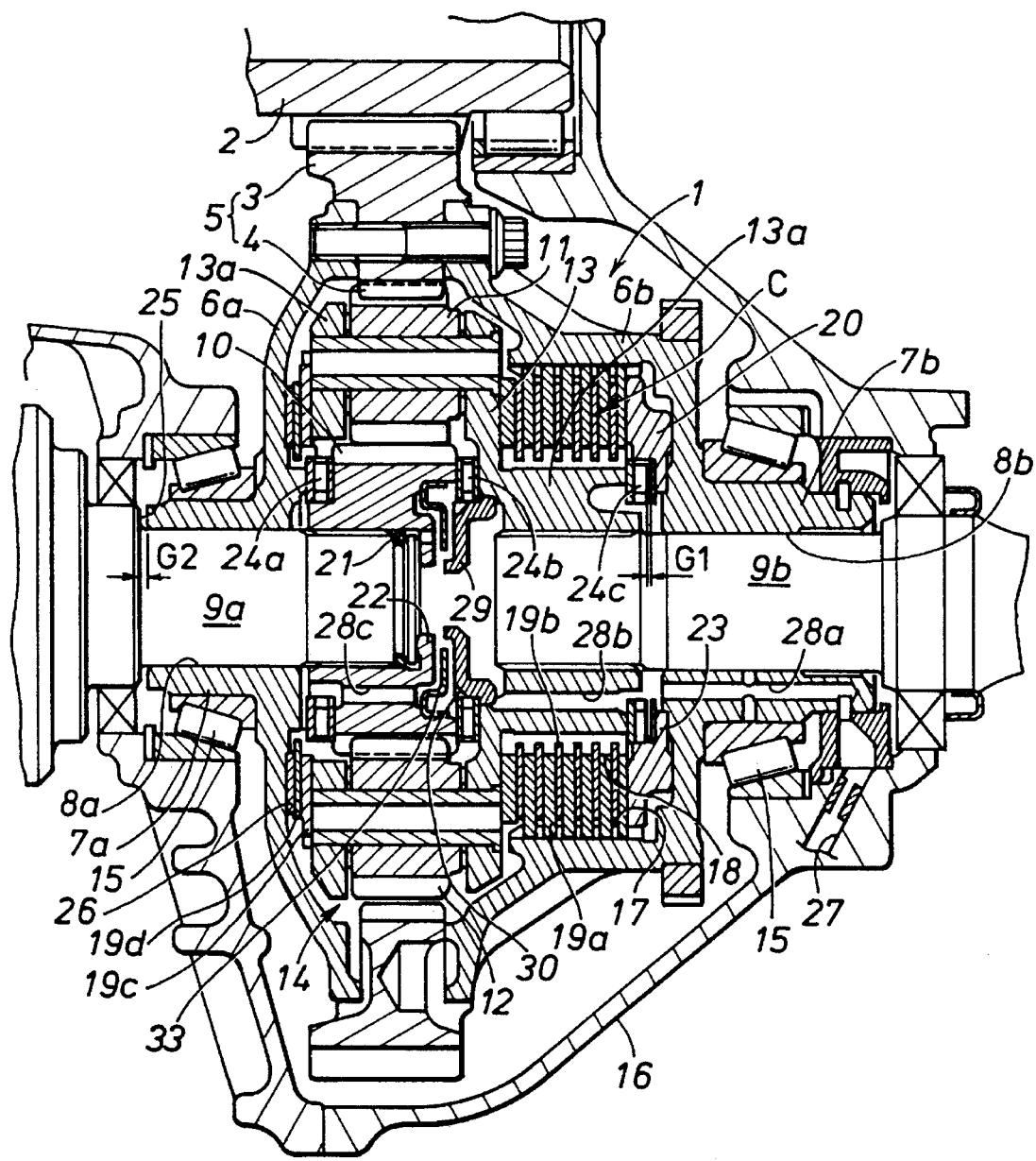
FIG. 1 sectional view of a preferred embodiment of the planetary differential gear system according to the present invention.

FIG. 1 shows an embodiment of the differential system 1 according to the present invention. This differential system comprises a differential casing 6 consisting of right and left halves 6a and 6b which are secured to each other with a ring gear member 5 interposed therebetween. The ring gear member 5 is provided with an outer gear 3 meshing with a final drive gear 2 mounted on an output shaft of a transmission device, and an internal gear 4 consisting of a helical gear coaxial with the outer gear 3. The differential casing 6 is provided with a pair of axial bosses 7a and 7b extending laterally in coaxial relationship with the ring gear member 5, and are supported by a transmission housing 16 by a pair of roller bearings 15.

An internal end of a left axle shaft 9a is received in an inner bore 8a of the boss 7a in a freely rotatable and axially slidable manner, and a splined innermost end of the left axle shaft 9a is fitted into a complementary splined bore of a helical sun gear 10 in an integrally rotatably manner. An internal end of a right axle shaft 9b is received in an inner bore 8b of the boss 7b in a freely rotatable manner, and a splined innermost end of the right axle shaft 9b is fitted into a complementary splined bore of a carrier 13 which carries three first planetary gears 11 meshing with the internal gear 4 of the ring gear member 5 in a freely rotatable manner, and three second planetary gears 14 meshing with the first planetary gears 11, and the sun gear 10 in a freely rotatable manner.

The inner surface of the right half 6b of the differential casing 6 is provided with an internal spline 17, and the opposing outer circumferential surface of a boss 13a of the carrier 13 is provided with an external spline 18. A plurality of friction plates 19a and 19b are fitted on these splines 17 and 18 in an alternating fashion, and these friction plates are interposed between an annular shoulder surface of the carrier 13 and a pressure plate 20 supported by an inner end surface of the right casing half 6b so as to form a per se known wet-type multi-disk clutch C.

The outward movement of the left axle shaft 9a is restricted by a set ring 21 received in an annular groove formed in the outer circumferential surface of the left axle shaft 9a and a similar annular groove formed in the inner circumferential surface of the splined bore of the sun gear 10, and the inward movement of the left axle shaft 9a is restricted by a radial internal flange 22 provided in the inner end of the inner bore of the sun gear 10. Thus, the sun gear 10 and the left axle shaft 9a are engaged with each other so as to jointly move in the axial direction.

Thrust needle bearings 24a, 24b and 24c are interposed between the inner end surface of the left casing half 6a and the opposing end surface of the sun gear 10, between the other end surface of the sun gear 10 and the opposing end surface of the carrier 13, and between the other end surface of the carrier 13 and an radial internal flange 23 of the pressure plate 20. In the initial unworn state of the friction plates 19a and 19b, an axial gap G1 is defined between the rightmost needle bearing 24c and the flange 23 of the pressure plate 20. At the same time, the left axle shaft 9a is provided with an annular shoulder surface 25 which opposes an annular end surface of the boss 7a of the left casing half 6a, and an axial gap G2 is defined between them. According to the present invention, G2 is greater than G1.

A pair of friction plates 19c and 19d similar to the friction plates 19a and 19b are interposed between the opposing annular surfaces of the left casing half 6a and the sun gear 10 along with a dish spring 26 so that a prescribed preload may be applied between the differential casing 6 and the carrier 13.

An oil passage 28a is passed axially through the boss 7b of the right casing half 6b supporting the right axle shaft 9b, and communicates with an oil passage 27 formed in the transmission housing 16. The oil passage 28a further communicates with axial oil passages 28b and 28c provided in the carrier 13 and the sun gear 10, respectively. Thus, oil supplied from an oil pump not shown in the drawings is introduced into the inner chamber defined between the sun gear 10 and the carrier 13 via the oil passage 27 of the transmission casing 16, and the oil passages 28a and 28b. The flow of the oil is then divided by an oil plate 33 into a flow directed to the oil passage 28c in the sun gear 20 and a flow directed to the meshing pans of the sun gear 10, the planetary gears 11 and 12 and the internal ring gear 4 via a notch 30 provided in a carrier oil plate 29 integrally attached to the carrier 13 and gaps provided in the intermediate thrust needle bearing 24b. Thus, by appropriate arrangement of the oil plates 29 and 33 and the oil passages 28a, 28b and 28c, oil for lubrication can reach the needle bearings 24a, 24b and 24c, and the end surfaces of the planetary gears 11 and 12.

According to this differential gear system, the power delivered to the driven gear 3 is distributed to the right and left axle shafts 9a and 9b via the sun gear 10 and the carrier 13. If there is no difference in the rotational speeds of the two wheels or the two axle shafts 9a and 9b rotate at a same speed, the ring gear 5, the sun gear 10 and the carrier 13 all rotate at a same speed, and the planetary gears 11 and 12 do not rotate around their respective centers.

When there is any difference in the rotational speed of the two wheels, the planetary gears 11 and 12 start rotating around their centers as well as around the center of the sun gear 10 so as to accommodate the difference in the rotational speeds of the two wheels. The dish spring 26 applies a certain preload to the clutch C via the carrier 13 so as to slightly limit the differential action of the differential gear system 1.

Because the planetary gears 11 and 12, the sun gear 10 and the internal ring gear 4 all consist of helical gears, when a drive force is applied to the differential system, an axial force is produced in these gears, and the sun gear 10, in particular, is urged rightward so as to apply an axial force to the clutch C, and engage the same. On the other hand, the reaction forces produced in the first and second planetary gears 11 and 12 cancel out with each other, and the carrier 13 itself therefore does not produce any axial reaction force. As a result, the tarrier 13 urged by the sun gear 10 and the differential casing 6 are mutually engaged, and the right and left axle shafts 9a and 9b are forced to rotate at a same speed.

Conversely, when the vehicle is decelerating and engine brake is in effect, the sun gear 10 is urged leftward, and the carrier 13 is not urged by the sun gear 10 any more. As a result, the clutch C returns to its initial preloaded condition with only the dish spring 26 biasing the clutch C in the direction to engage the same.

In this differential system, it is essential for the mechanism for restricting the difference in the rotational speeds of the two axle shafts to operate in a stable manner that the sun gear 10 is allowed to move freely in the axial direction. According to the present invention, engagement means is provided between the left axle shaft 9a and the sun gear 10, and these two parts can move jointly in the axial direction without any restriction from the differential casing half 6a. The present invention is typically applied to a front-engine front-drive (FF) vehicle or a rear-engine rear drive (RR) vehicle, and the left axle shaft 9a is normally connected to a left wheel via a pair of tri-pod joint while the right axle shaft 9b is connected to a half shaft which is in turn connected to a right wheel via a pair of tri-pod joint. The half shaft is rotatably supported by the engine block, and is restricted from making any axial displacement. Therefore, the inner end of the right axle shaft 9b is simply fitted into the splined bore of the carrier 13, but the right axle shaft 9b would not make any erratic or unpredictable axial movement. On the other hand, the left axle shaft 9a is engaged to the sun gear 10, and thereby jointly moves with the sun gear 10 in the axial direction. The axial movement of the left axle shaft 9a along with the sun gear is dictated by the reaction force produced in the sun gear 10, and is accommodated by the tri-pod couplings or other mechanism (not shown in the drawing) that may be connected to the left axle shaft 9a for transmitting torque to the left wheel.

Figure 2:
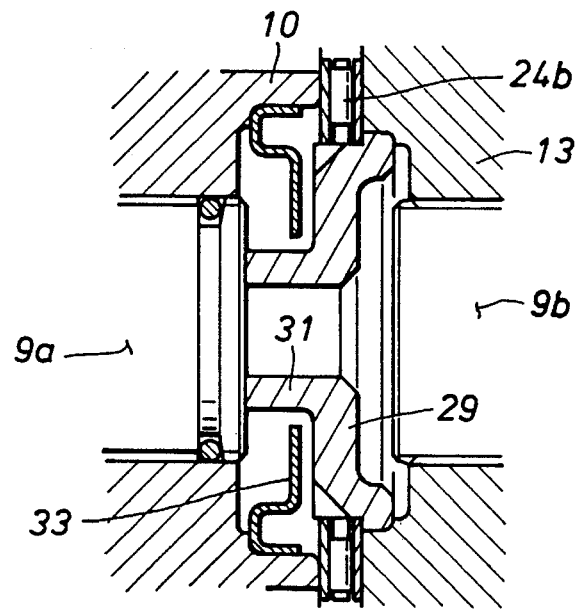
FIG. 2 is an enlarge fragmentary sectional view showing a second embodiment of the present invention.
Figure 3:
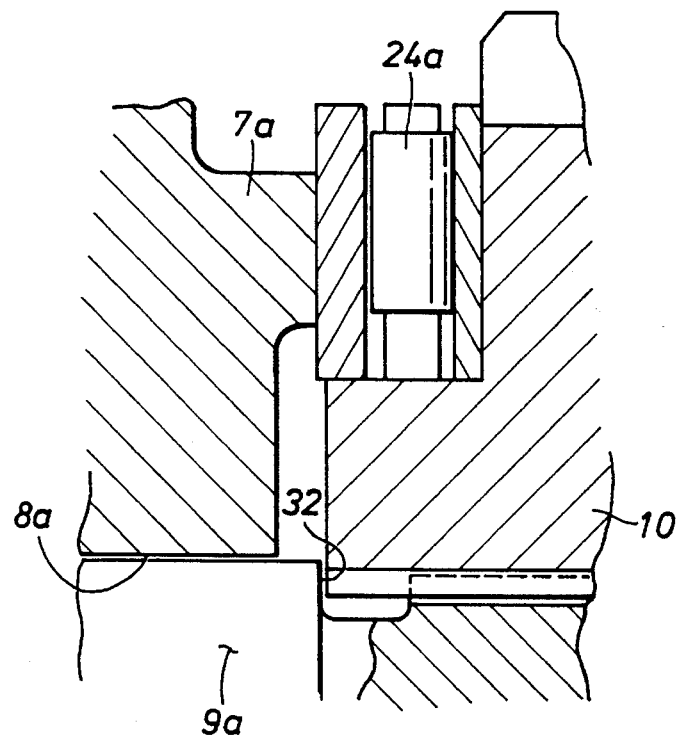
FIG. 3 is a view similar to FIG. 2 showing a third embodiment of the present invention.

FIG. 2 shows a second embodiment of the engagement means for restricting relative axial movement of one of the axle shafts and the sun gear. In this embodiment, the inward movement of the left axle shaft 9a is restricted by an axial stopper member 31 which, for instance, may be formed as an integral extension of the oil plate 29 secured to the carrier 13. In the embodiment shown in FIG. 3, the left axle shaft 9a is provided with an annular shoulder 32 which can abut an end surface of the sun gear 10 to restrict the inward movement of the left axle shaft 9a.

Although the present invention has been described in terms of preferred embodiments thereof, it is obvious to a person skilled in the art that various alterations and modifications are possible without departing from the scope of the present invention which is set forth in the appended claims.

What we claim is:

1. A differential gear system, comprising:

a differential casing provided with an external gear for receiving a drive input, and an internal helical gear disposed coaxially with said external gear, and rotatably supported by a fixed housing in a coaxial relationship;

a helical sun gear rotatably supported inside said differential casing by said differential casing, and disposed coaxially with said internal helical gear, said sun gear being provided with a first splined bore coaxial with said sun gear for receiving a first axle shaft;

engagement means for restricting a relative axial displacement between said first axle shaft and said sun gear;

a carrier rotatably supported by said differential casing, carrying a first helical planetary gear and a second helical planetary gear both in a freely rotatable manner, said first planetary gear meshing with said helical internal gear, said second helical planetary gear meshing with said first helical planetary gear and said sun gear, said carrier being provided with a second splined bore coaxial with said sun gear for receiving a second axle shaft; and a clutch interposed between said carrier and said differential casing, and adapted to be engaged by an axial thrust force produced by said sun gear and applied to said carrier by said sun gear;

said first axle shaft being received in a bore of said differential casing so as to be freely slidable and rotatable jointly with said sun gear.

2. A differential gear system according to claim 1, further comprising first stopper means for limiting a movement of said carrier in a direction to engage said clutch within a first prescribed range.

3. A differential gear system according to claim 2, further comprising second stopper means for limiting an inward movement of said first axle shaft within a second prescribed range which is greater than said first prescribed range.

4. A differential gear system according to claim 3, wherein said second stopper means comprises an annular shoulder surface defined in said first axle shaft and adapted to be engaged by an opposing end surface of said differential casing.

5. A differential gear system according to claim 4, wherein said engagement means comprises a set ring fitted in annular grooves provided in mutually aligned positions of said splined bore of said sun gear and said first axle shaft received in said splined bore.

6. A differential gear system according to claim 5, wherein said engagement means further comprises an internal radial flange provided in said sun gear so as to engage an inner axial end of said first axle shaft.

7. A differential gear system according to claim 5, wherein said engagement means further comprises a member provided on said carrier so as to engage an inner axial end of said first axle shaft.

8. A differential gear system according to claim 5, wherein said engagement means further comprises an annular shoulder surface provided on said first axle shaft, and an end surface of said sun gear adapted to engage said annular shoulder surface of said first axle shaft.

* * * * *